(12) United States Patent
Parker et al.

(10) Patent No.: US 8,459,453 B2
(45) Date of Patent: Jun. 11, 2013

(54) CARRYING CASE FOR DISPLAY APPARATUS

(76) Inventors: Kevin P. Parker, Berkeley, CA (US); Wayne Kasom, Oakland, CA (US)

( * ) Notice: Subject to any disclaimer, the term of this patent is extended or adjusted under 35 U.S.C. 154(b) by 107 days.

(21) Appl. No.: 12/951,218

(22) Filed: Nov. 22, 2010

(65) Prior Publication Data

US 2012/0125791 A1    May 24, 2012

(51) Int. Cl.
*B65D 85/00* (2006.01)
(52) U.S. Cl.
USPC .................. 206/320; 206/45.24; 206/45.2
(58) Field of Classification Search
USPC ............... 206/45.2, 45.23–45.26, 45.28, 320, 206/755, 762, 764; 40/775, 124.18, 124.19, 40/748–750, 756, 753, 742; 248/372.1, 417, 248/135, 136, 457, 459, 460, 116
See application file for complete search history.

(56) References Cited

U.S. PATENT DOCUMENTS

| | | | | |
|---|---|---|---|---|
| 1,892,014 A | * | 12/1932 | Singer et al. | 40/748 |
| 5,068,987 A | * | 12/1991 | Tontarelli | 40/753 |
| 7,484,326 B2 | * | 2/2009 | Tamura et al. | 40/748 |
| 7,758,009 B1 | * | 7/2010 | Chang | 248/460 |
| 2010/0175289 A1 | * | 7/2010 | Bair | 40/745 |

* cited by examiner

*Primary Examiner* — Mickey Yu
*Assistant Examiner* — Chun Cheung
(74) *Attorney, Agent, or Firm* — Girard & Equitz LLP

(57) ABSTRACT

A carrying case for a display apparatus which includes a frame for receiving the display device and a folding stand mechanism secured to the frame for supporting the frame on a support surface. The folding stand mechanism includes a folding stand base, a major folding support rotatably mounted on the folding stand base, with the major folding support being movable between a closed position adjacent the folding stand base and at least one open position. A minor folding support is rotatably mounted on the major support, with the minor folding support being moveable between a closed position near the major folding support and at least one open position. When the major support is moved to it's at least one open position, the minor support is movable to it's at least one minor open position where the minor support is disposed between the major folding support and the folding stand base. The display apparatus is supported on a surface by any one of four edges of the display apparatus along with the opened folding stand mechanism.

6 Claims, 7 Drawing Sheets

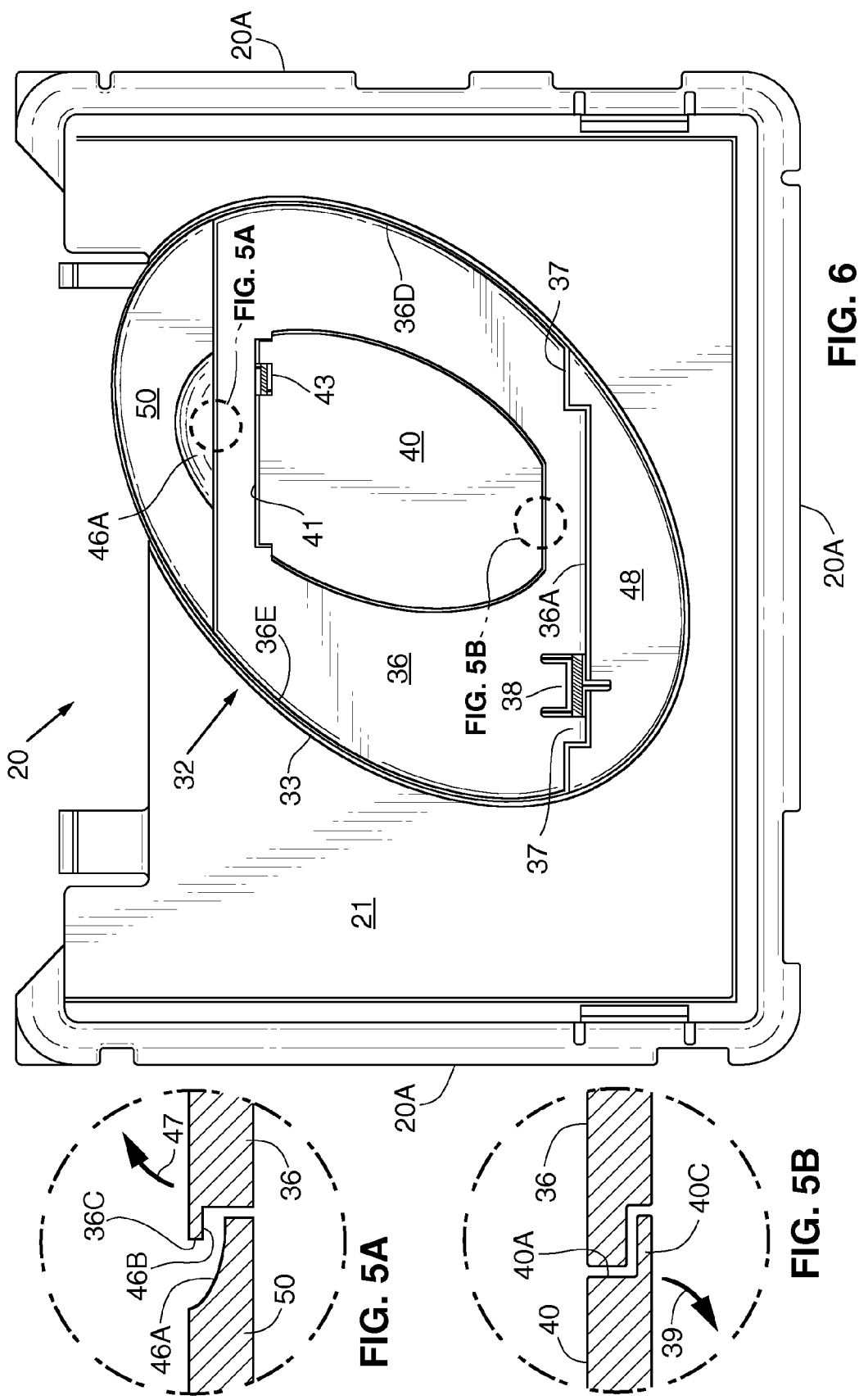

CARRYING CASE FOR DISPLAY APPARATUS

BACKGROUND OF THE INVENTION

1. Field of the Invention

The present invention relates generally to carrying cases and in particular to carrying cases for display apparatus such a tablet computers, e book readers and the like.

2. Description of Related Art

Tablet computers, e book readers and other electronic devices having relatively large displays are becoming more popular. Various types of carrying cases have been developed for safely transporting these devices. However, it is sometimes difficult to position these devices, while in a carrying case or not, for extended viewing or group viewing. By way of example, when reading an e book in bed, a user may be required to manually support the book which can be tiring. Although carrying cases have been developed for these various kinds of display devices, such cases do not provide sufficiently flexibility to support the device for comfortable viewing in a wide range of viewing conditions.

The present invention provides a carrying case which enables a single or group of viewers to enjoy a display apparatus under most viewing conditions. These and other advantages of the present invention will become apparent to those skilled in the art upon a reading of the following Detailed Description of the Invention along with the drawings.

SUMMARY OF THE INVENTION

A carrying case for a display apparatus is disclosed which includes a frame for receiving the display device and a folding stand mechanism secured to the frame for supporting the frame on a support surface. The folding stand mechanism includes a folding stand base, a major folding support rotatably mounted on the folding stand base, with the major folding support being movable between a closed position adjacent the folding stand base and at least one major open position were one end of the major folding support is displaced away from the folding stand base. Also included is a minor folding support rotatably mounted on the major folding support, with the minor folding support being moveable between a closed position near the major folding support and at least one minor open position where one end of the minor folding support is displaced away from the major folding support. A pair of springs biases the respective major and minor folding supports towards their respective closed positions. When the major folding support is moved to the at least one major open position, the minor folding support is movable to the at least one minor open position where the minor folding support is disposed between the major folding support and the folding stand base. The display apparatus is supported on a surface by any one of four edges of the display apparatus in combination with the opened folding stand mechanism.

BRIEF DESCRIPTION OF THE DRAWINGS

FIGS. 5A and 5B are partial cross-sectional views of selected portions of the frame of FIG. 6.

FIG. 6 is a plan view of one embodiment of a frame for the subject carrying case.

DETAILED DESCRIPTION OF THE INVENTION

Figure 1:
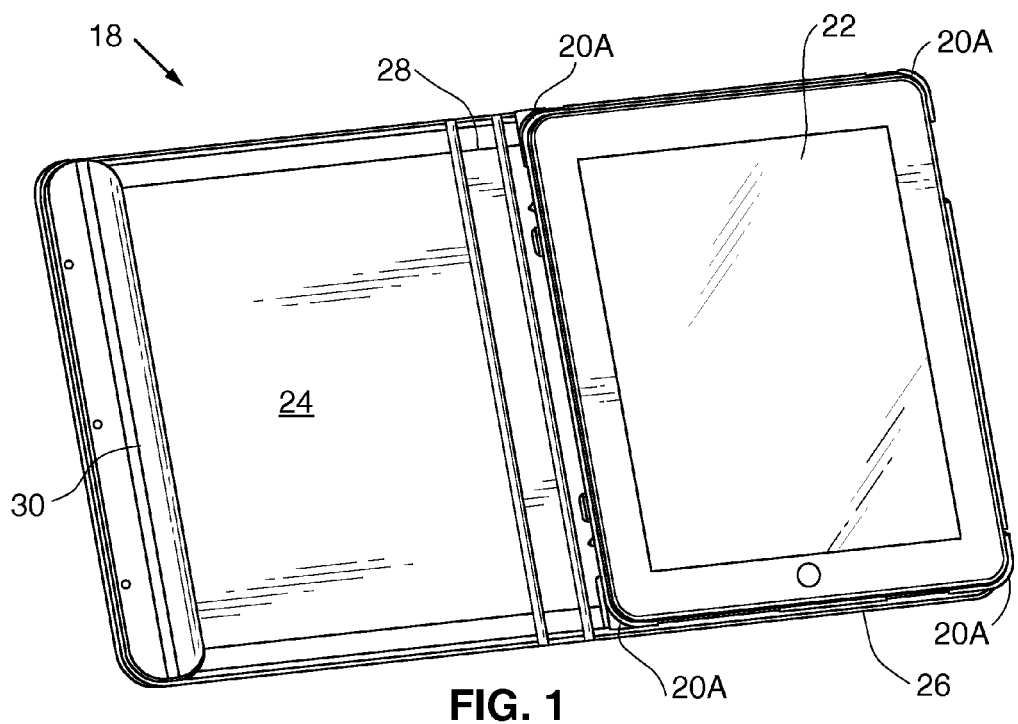
FIG. 1 is a perspective interior view of one embodiment of the subject carrying case with a display apparatus such as a tablet computer installed.
Figure 2:
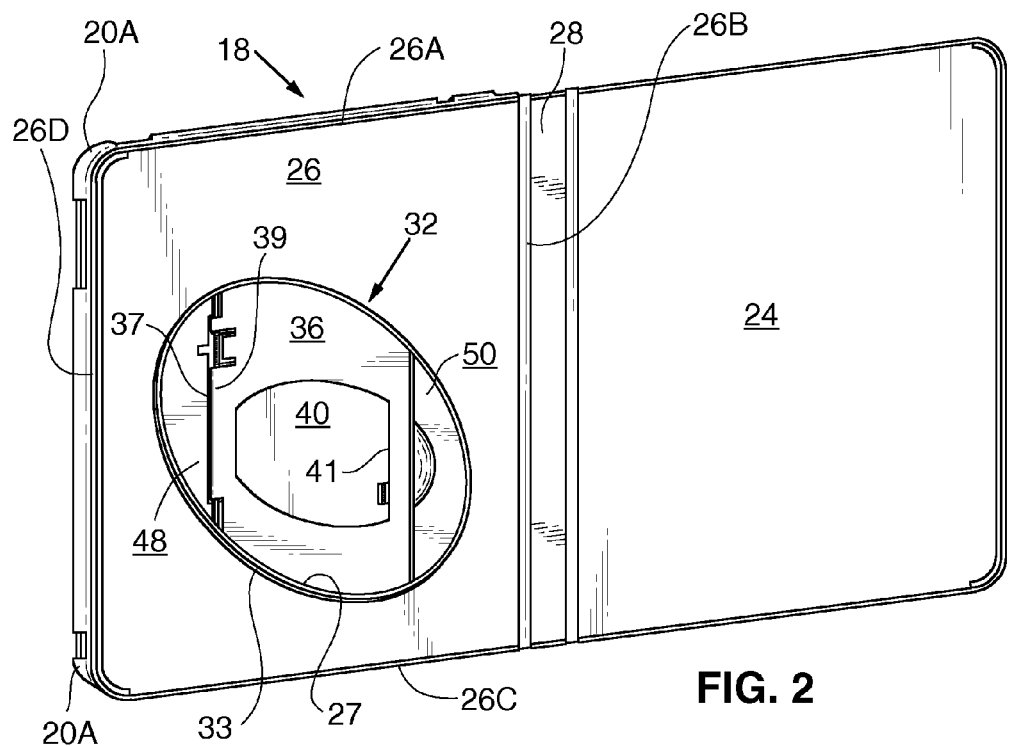
FIG. 2 is a perspective exterior view of one embodiment of the subject carrying case showing some details of a folding stand mechanism in a closed position.

Referring again to the drawings, FIGS. 1 and 2 depict a carrying case 18 in accordance with one embodiment of the present invention. The case includes a plastic frame 20 as depicted in FIG. 6 which is installed within a cover assembly which includes a front cover 24, a rear cover 26 and a spine section 28. A clip 30 for storing business cards and the like is provided in the interior of the front cover 24. The frame 20 includes a folding stand mechanism 32 mounted within a raised elliptical shaped pedestal 33. The relatively thin pedestal 33 extends away from the base 21 of the frame a distance equal to the thickness of the rear cover 26. The rear cover 26 is provided with a corresponding elliptical shaped opening 27, which accepts the pedestal 33.

The frame 20 is provided with flexible plastic tabs 20A with extend around the periphery of the frame for securing a tablet computer, e reader or other type of display apparatus 22 within the frame. As previously noted, the frame 20 is mounted on the inner surface of the cover 26, with the pedestal 33 extending through the frame opening, with the frame being secured in place on the cover by a suitable adhesive or the like.

When the folding stand mechanism 32 is in a folded or stored position, the outer surface of the various components that make up the mechanism form a planar surface at the top of the pedestal which coincides with the outer surface of the rear cover 26. This provides an attractive appearance. In addition, the display apparatus and cover can be placed on a flat surface and can be carried without interference from the folding stand mechanism.

Figure 9:
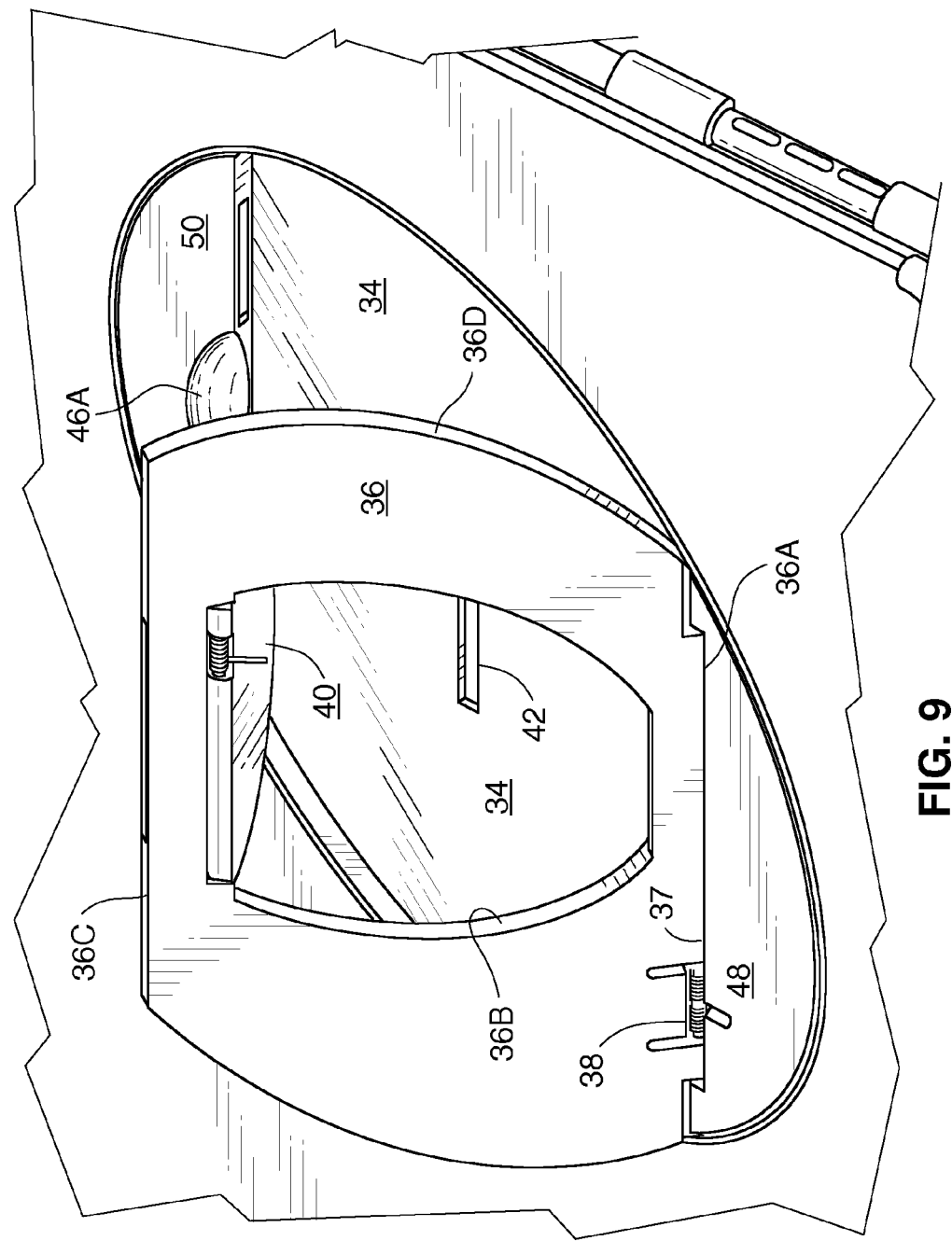
FIG. 9 is another perspective view of the stand mechanism.
Figure 10:
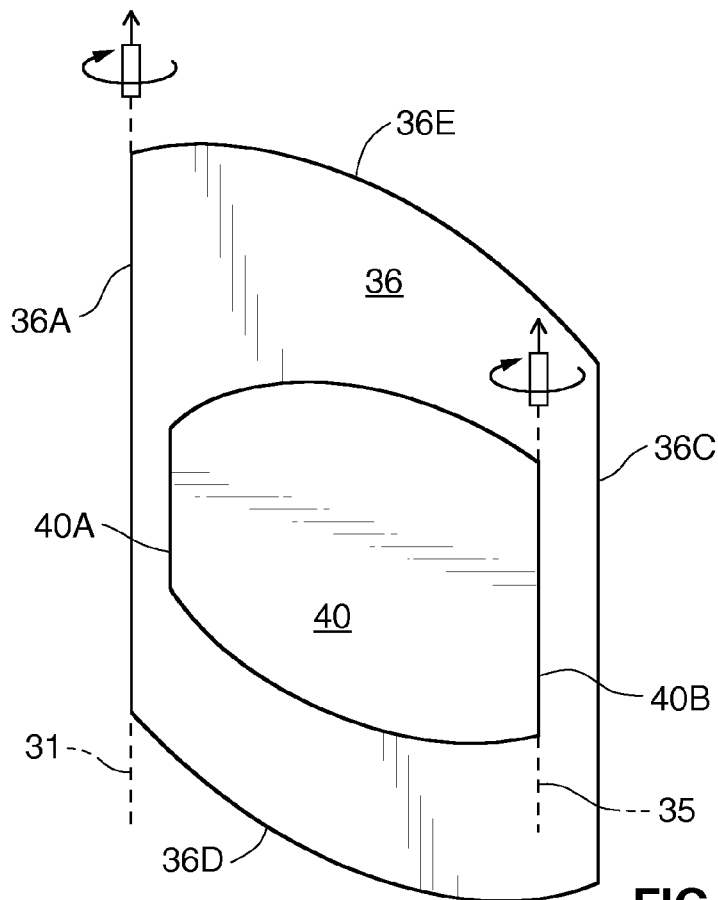
FIG. 10 is a plan view of the major folding support and the minor folding support in the folded position.

The folding stand mechanism 32 includes a major folding support 36 having a truncated elliptical shape which generally coincides with part of the elliptical shape of the pedestal 33 as depicted in FIG. 10. One edge 36A of the major folding support 36 is secured by a hinges 39 so that the support 36 can be folded to an open position as shown in FIGS. 3 and 4 about an axis of rotation 31. The edge 36A about which the support 36 rotates is generally parallel to the spine 20 of the cover assembly. A spring 38 (FIG. 9) is provided which biases the support 36 to the closed position adjacent recess surface 34. As can best be seen in FIG. 5A, a finger recess 46A is formed in a surface 50 of the mechanism to allow a user to lift the major folding support 36 away from the mechanism in a direction indicated by arrow 47 using an extension 46B located on an edge 36C of the support.

The stand mechanism further includes a minor folding support 40 which is secured to the major folding support 36 by a hinge 41. When in a closed position, folding support 40 is disposed within an opening 36B of support 36 having a shape that corresponds to the shape of support 36 so that the two supports are co-planar. A spring 43 biases the folding support 40 to the closed position within support 36. As can be seen in FIG. 5B, support 40 is provided with an extension 40C to prevent the folding support 40 from passing completely through the opening in the major support 36 due to the pressure of the spring. A user can move the minor support 40 away from the major support 36 by pressing down on support 40 in the direction of arrow 39 so that the support will rotate around the axis of rotation 35 (FIG. 10). Note that axes of rotation 31 and 35 are parallel to one another and parallel to support edge 36C of the major folding support and parallel to support edge 40A of the minor folding support.

As can best be seen in FIG. 6 and as previously noted, the shape of the pedestal 33 is elliptical, with the major axis of the ellipse being at about a 45° angle with respect to the case spine 28 and the edge of the display apparatus. The major folding support 36 has a shape of a truncated ellipse which is formed by truncating lines generally parallel to the case spine 28, with the lines extending through the ellipse. The location of pedestal 33 on frame 20 is offset from the center of the case back cover 26 to add to the variations in viewing angles depending upon whether the carrying case is supported on one or the other case edges 26A and 26C. As will also be explained, the asymmetry of the major folding support 36 (FIG. 10) with respect to an axis normal to the case spine 28 results in differing support surfaces 36E and 36D which contact the support surface thereby further adding to the potential viewing angles. In addition, the elliptical shape of the pedestal 33, which is visible though the opening in the case back cover 26, together with the truncated elliptical shape of the major folding support 36 and the truncated and generally oval shape of minor support 40 add substantially to the visual impact of the subject carrying case, an important attribute for this type of personal product.

Figure 11:
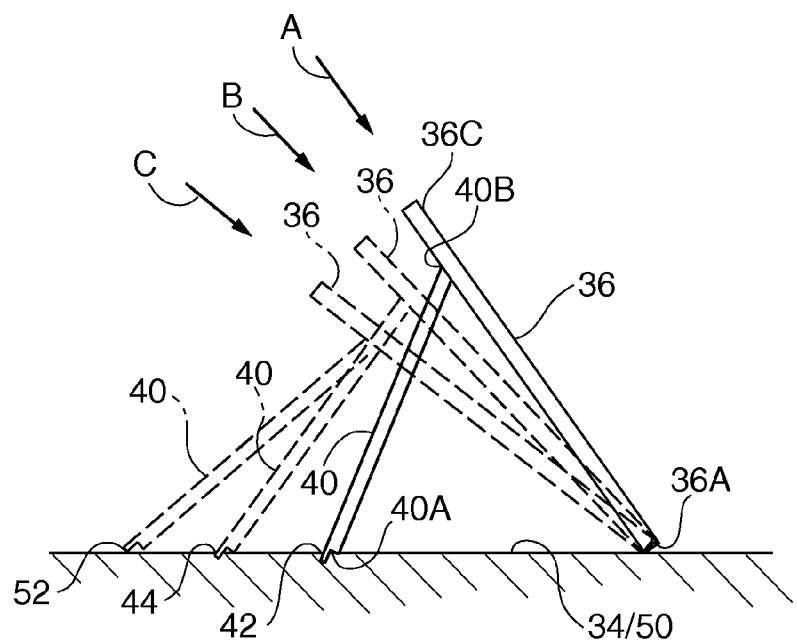
FIG. 11 is a schematic representation of the folding stand mechanism in three different positions.

The exemplary folding stand mechanism 32 can be moved from a closed position to one of three open positions A, B and C as shown schematically in FIG. 11. With respect to position A, a user first lifts edge 36C of major support 36 from the closed position using finger recess 46A and extension 46B (FIG. 5A) in a direction indicated by arrow 47 with this action overcoming the biasing force of spring 38. This rotation is about rotational axis 31 of FIG. 10. The minor support 40 is secured within the major support by virtue of spring 43 so that rotating support 36 also lifts support 40. The user then presses down on the minor support 40, as shown in FIG. 4 for example, in order to cause the minor support to rotate about the axis of rotation 35 (FIG. 10) as indicated by direction arrow 39 of FIG. 5B. This rotation causes the free end 40A of the minor support to move away form the major support 36.

Figure 3A:
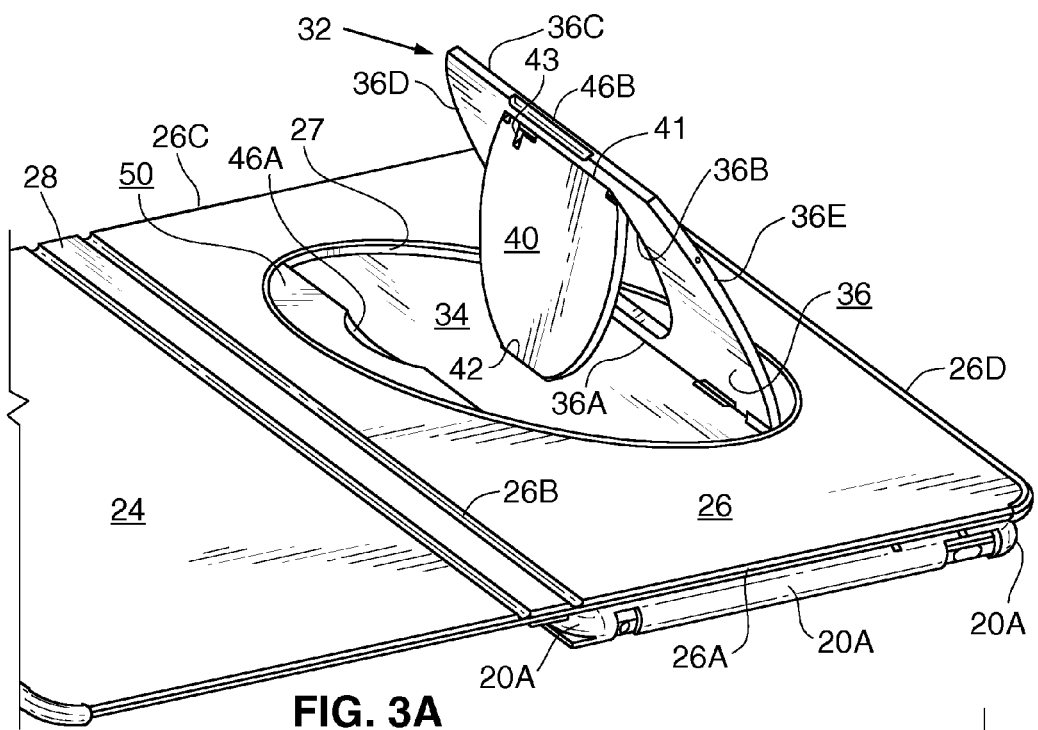
FIGS. 3A and 3B are perspective views of the folding stand mechanism in one open position.
Figure 3B:
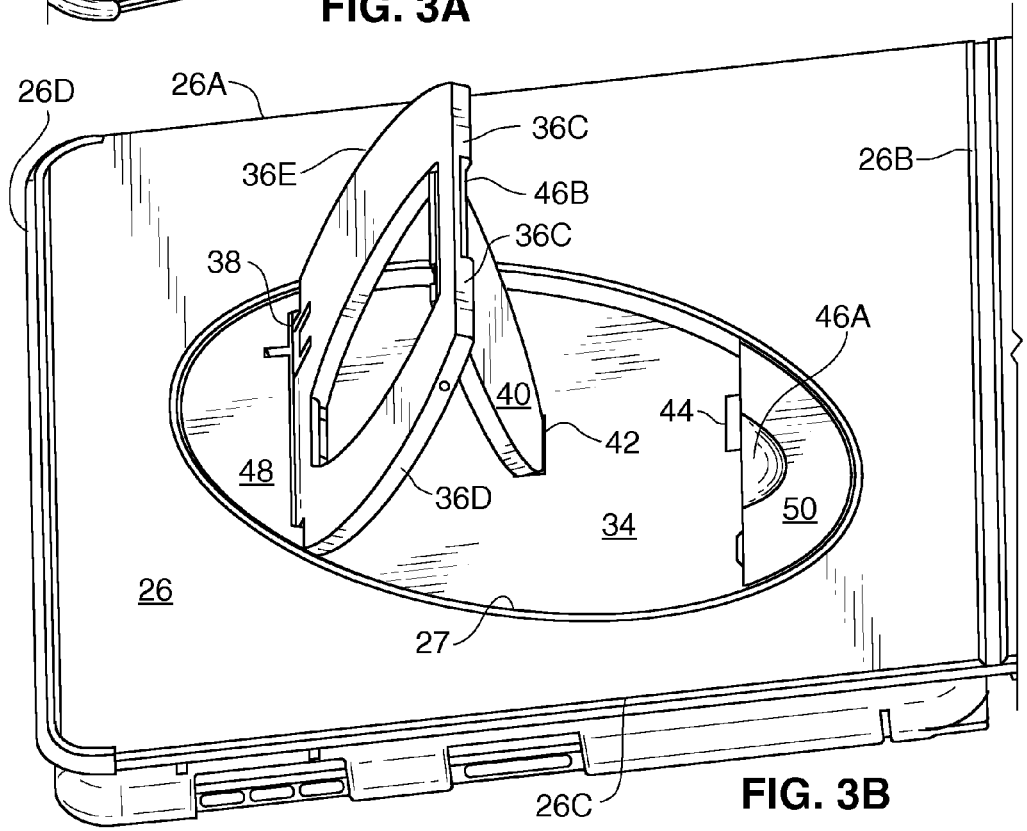

As can best be seen in FIGS. 3A and 3B, the user then inserts the extension 40C of the free end 40A of the minor folding support in a first notch 42 formed in the recess surface 34. The weight of the display apparatus 22 will cause the extension 40C to remain secured within notch 42 so that supports 36 and 40 along with base 34 form a triangular shaped and therefore rigid structure. The user can then place any one of the four edges 26A, 26B, 26C and 26D (FIG. 2) of the case back cover 26 on a support surface for viewing the display.

Figure 7:
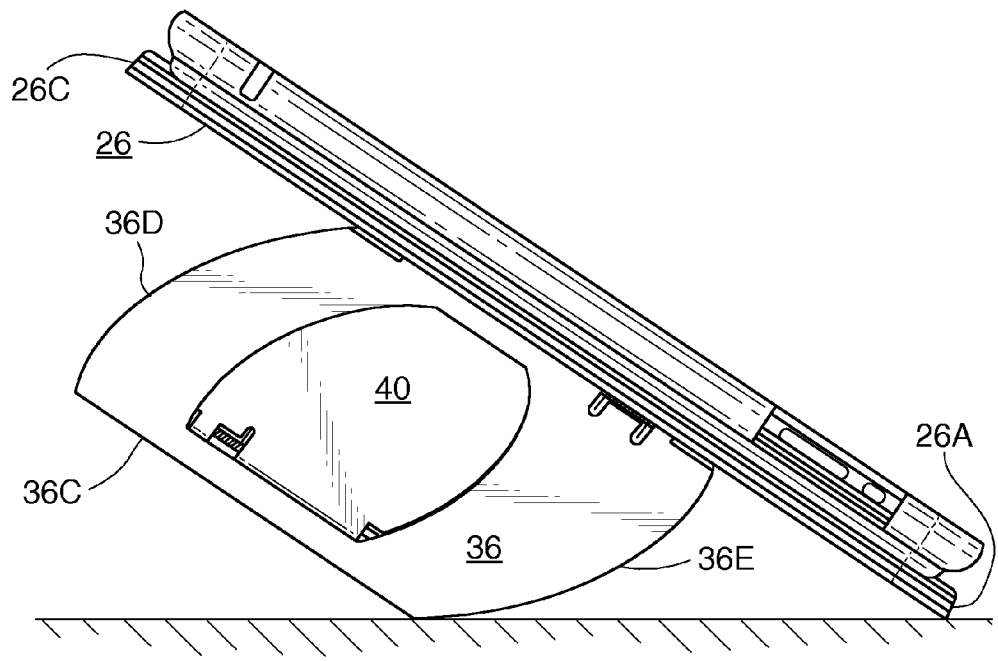
FIG. 7 is a side view of the subject carrying case and display apparatus supported in one viewing angle.
Figure 8:
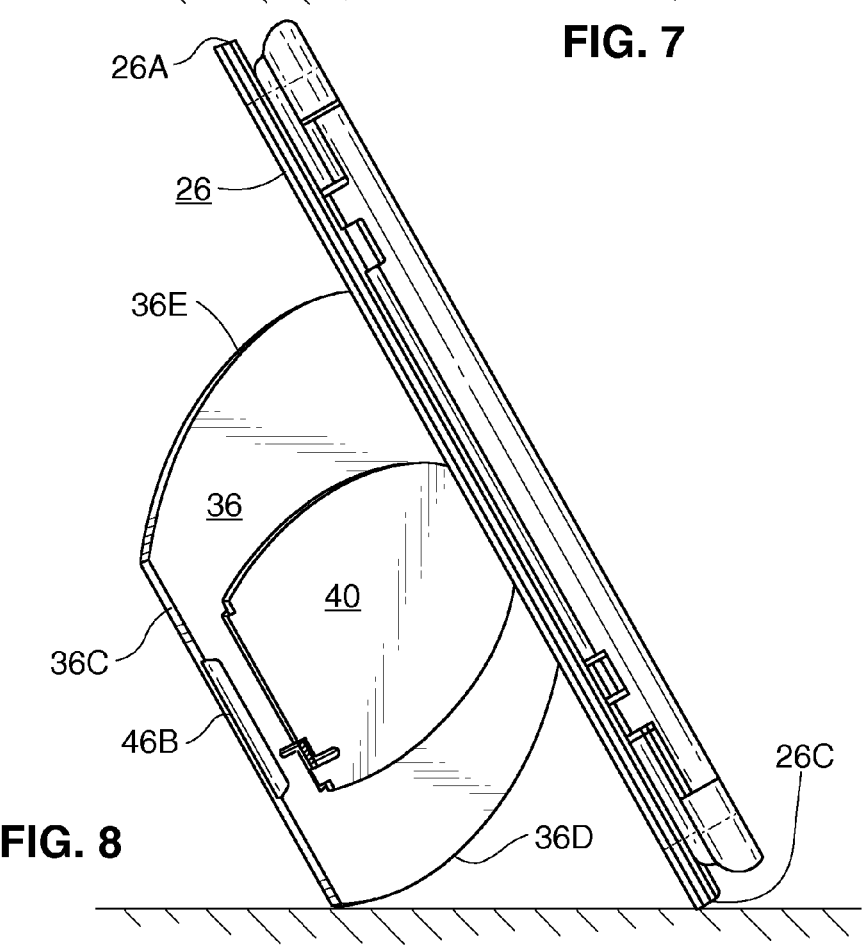
FIG. 8 is a side view of the subject carrying case and display apparatus supported in another viewing angle.

If the display is in portrait format, either edge 26A or 26C is placed on the support surface. FIG. 7 shows one example where edge 26A is on the support surface so that edge 36E of the major folding support 36 will also contact the support surface. If opposite edge 26C is placed on the support surface as shown in FIG. 8, then edge 36D of the folding support 36 will contact the surface. Since support 36 is asymmetrical about an axis normal to the axis of rotation 31 (FIG. 10), the viewing angle of FIG. 7 will differ substantially from that of FIG. 8. Either angle can be selected by either reinstalling the display apparatus or, if possible, electronically flipping the display.

If the display is in landscape format, the back cover edge 26B or the opposite edge 26D can be placed on the support surface along with edge 36C of the major folding support 36. To ensure that the image is vertical, the user may have to reinstall the display apparatus in the case or, if the capability is provided, electronically flip the display image. Since the folding stand mechanism 32 is positioned differing distances from the opposite edges 26B and 26D of the case back cover 26, the viewing angle will be different depending upon which edge is placed on the support surface.

Figure 4A:
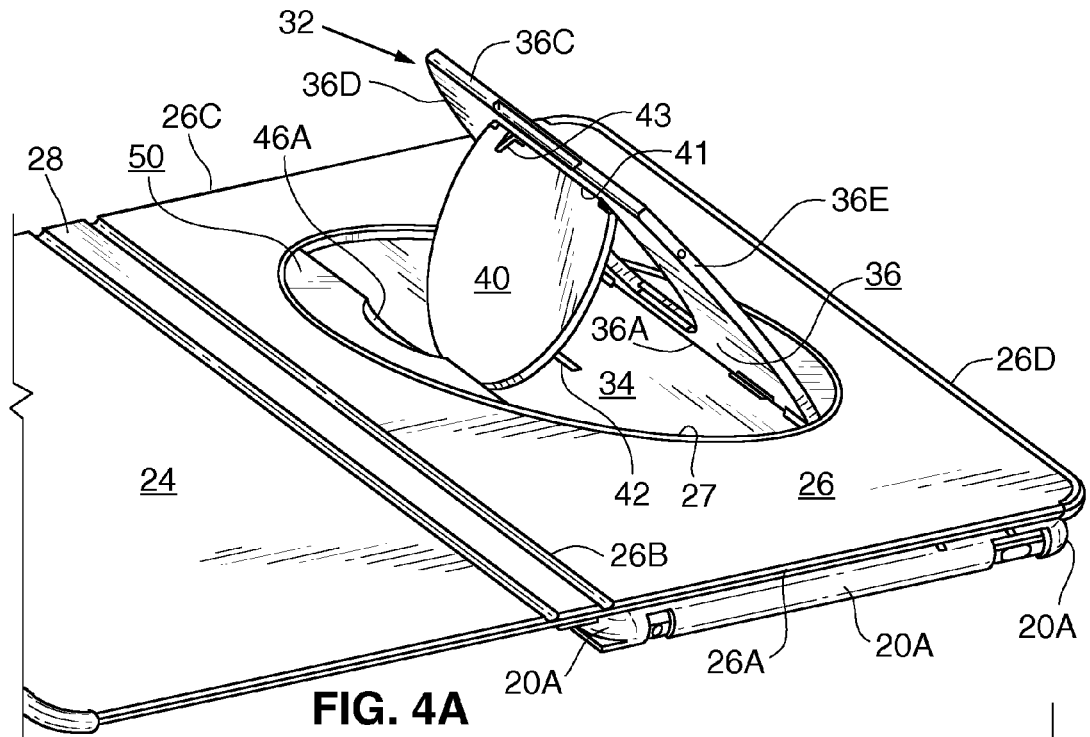
FIGS. 4A and 4B are perspective views of the folding stand mechanism in another open position.
Figure 4B:
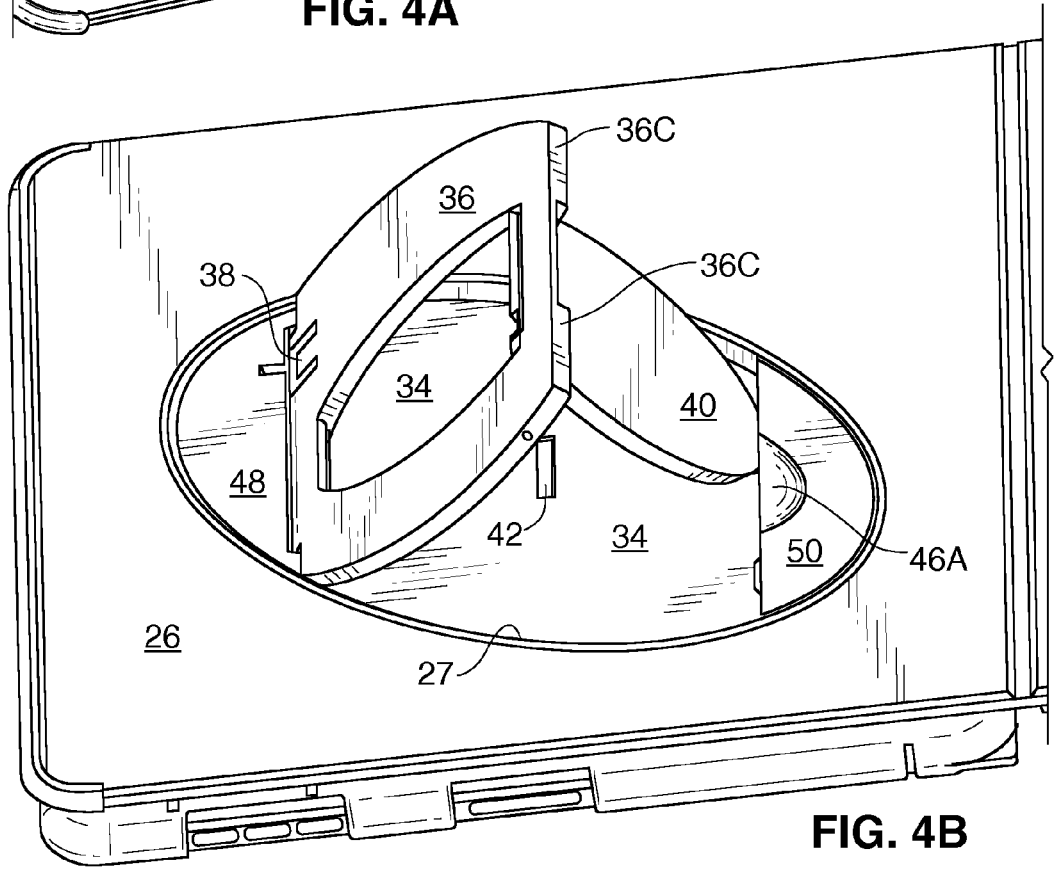

An entire new set of viewing angles can be achieved by moving the folding stand mechanism from open position A to position B as schematically depicted in FIG. 11. In that case, the extension 40C located at the free edge 40A of the minor folding support is moved into slot 44 instead of slot 42. This is depicted in FIGS. 4A and 4B. This will change the set of viewing angles depending upon which of edges 26B and 26D is placed on the support surface.

A third set of viewing angles can be achieved by moving the folding stand mechanism to open position C shown in FIG. 11. In the case, the free edge 40A is positioned on surface 50, with the hinge 41 of the minor folding support 40 having a built in stop (not depicted) which prevents support 40 from continuing to rotate with respect to folding support 36. Thus, the angle formed between supports 36 and 40 cannot be increased any further. The weight of the display apparatus 22 will force edge 40A to maintain support 40 in this extended position at location 52 thereby providing still another set of differing viewing angles depending upon which of the four edges is placed on the support surface.

It can be seen that springs 38 and 43 act upon their respective folding supports to provide a tension that causes the supports to remain in any one of the three open positions A, B and, to some extent, position C. Thus, it is possible to reposition the display apparatus 22 and carrying case combination on the support surface or on another support surface without the need for readjusting the folding supports. Further, the user can easily store the folding stand mechanism by applying a slight lifting force on major folding support 36. This will allow the minor support 40 to automatically snap back into place within the major folding support 36. Then, it is only necessary to release the major support 36 to allow support 36 to snap back in place thereby placing the folding stand mechanism in the fully closed position.

Thus, a novel carrying case for a display device has been disclosed. Although one embodiment of the carrying case has been described in some detail, it is to be understood that certain changes can be made by those skilled in the art without departing from the spirit and scope of the invention as defined by the appended claims.

What is claimed is:

1. A carrying case for a display apparatus, said carrying case including:
    a frame for receiving the display device;
    a folding stand mechanism secured to the frame for supporting the frame on
    a support surface, said folding stand mechanism comprising
        a stand base, with the stand base including a raised section;
        a major folding support rotatably mounted on the stand base, with said major folding support being movable between a major closed position and at least one major open position where one end of the major folding support is displaced away from the stand base, with the major folding support having a first surface which is generally coplanar with an upper surface of the raised section of the stand base when the major folding support is in the major closed position;

a first bias means for biasing the major folding support towards the major closed position;

a minor folding support rotatably mounted on the major folding support, with said minor folding support being moveable between a minor closed position and at least one minor open position where one end of the minor folding support is displaced away from the major folding support, with the minor folding support having a first surface which is generally coplanar with the upper surface of the raised section of the stand base when the minor folding support is in the minor closed position;

a second bias means for biasing the minor folding support towards the minor closed position; and a front and rear carrying case cover and a spine section connected intermediate the front and rear carrying case covers, with the rear carrying case cover having an opening for receiving the raised section of the stand base with the rear carrying case cover having an exposed outer surface which is generally coplanar with the upper surface of the raised section of the stand base;

wherein, when the major folding support is moved to the at least one major open position, the minor folding support is movable to the at least one minor open position where the minor folding support is disposed between the major folding support and the stand base, and wherein the first surface of the major folding support encircles the first surface of the minor folding support when the major and minor folding supports are in their respective closed positions.

2. A carrying case for a display apparatus, said carrying case including:

a frame for receiving the display device;

a case including a case front cover, a case back cover and a case spine section connected intermediate the front and back cover, with the back cover having an inner surface secured to an outer side of the frame;

a folding stand mechanism for supporting the frame on a support surface, said folding stand mechanism comprising a raised stand base extending away from the outer side of the frame and through an opening in the case back cover;

a major folding support mounted for rotation on the raised stand base about a first axis, with said major folding support being movable between a closed position adjacent the raised stand base and at least one major open position where one end of the major folding support is displaced away from the raised stand base;

a minor folding support mounted for rotation on the major folding support about a second axis parallel to the first axis, with said minor folding support being moveable between a closed position coplanar with the major folding support and at least one minor open position where one end of the minor folding support is displaced away from the major folding support; and wherein, when the major folding support is moved to the at least one major open position, the minor folding support is movable to the at least one minor open position where the minor folding support is disposed between the major folding support and the raised stand base.

3. The carrying case of claim 2 wherein at least a part of the minor folding support is disposed in a cutout formed in the major folding support when the minor folding support is in the closed position.

4. The carrying case of claim 3 wherein the cutout in the major folding support is an opening in which the minor folding support is disposed so that the major folding support extends completely around the minor folding support when the minor folding support is in the closed position.

5. The carrying case of claim 4 wherein the raised stand base includes a planar outer surface, with the major and minor folding supports having respective outer surfaces coplanar with the raised stand base planar outer surface when major and minor folding supports are in theft respective closed positions.

6. The carrying case of claim 2 further including a first spring connected for biasing the major folding support to the closed position and including a second spring connected for biasing the minor folding support to the closed position.

* * * * *